C. SCHENCK.
HUB CAP LOCKING DEVICE FOR WIRE SPOKE OR OTHER DEMOUNTABLE WHEELS.
APPLICATION FILED AUG. 13, 1917.
1,333,636.
Patented Mar. 16, 1920.
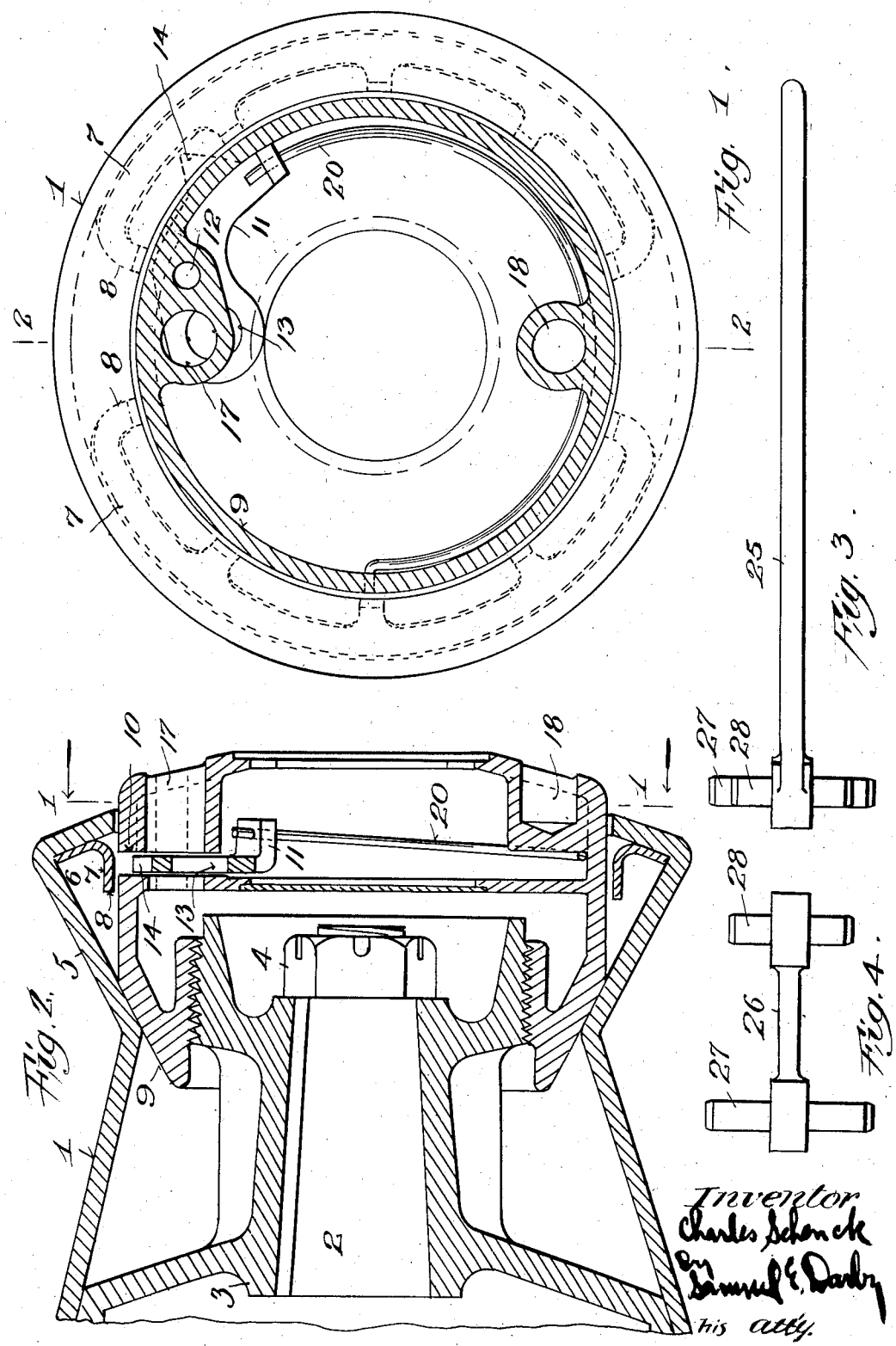

UNITED STATES PATENT OFFICE.

CHARLES SCHENCK, OF PHILADELPHIA, PENNSYLVANIA, ASSIGNOR TO BUDD WHEEL CORPORATION, OF PHILADELPHIA, PENNSYLVANIA, A CORPORATION OF VIRGINIA.

HUB-CAP-LOCKING DEVICE FOR WIRE-SPOKE OR OTHER DEMOUNTABLE WHEELS.

1,333,636.  Specification of Letters Patent.  Patented Mar. 16, 1920.

Application filed August 13, 1917. Serial No. 185,996.

*To all whom it may concern:*

Be it known that I, CHARLES SCHENCK, a citizen of the United States, residing at Philadelphia, in the county of Philadelphia, State of Pennsylvania, have made a certain new and useful Invention in Hub-Cap-Locking Devices for Wire-Spoke or other Demountable Wheels, of which the following is a specification.

This invention relates to hub cap locking devices for demountable wheels.

An object of the invention is to provide a hub cap locking device for wheels which is simple, economical to manufacture, and efficient in operation.

A further object of the invention is to provide a hub structure for wheels which permits the wheel to be readily detachable from its supporting hub and replaceable thereon, and when replaced upon its hub to be clamped and secured thereon.

A further object of the invention is to provide means for locking the detachable wheel upon its carrying hub, the locking means being released by the application of a spanner or other suitable tool to release the clamping nut.

Further objects of the invention will appear more fully hereinafter.

The invention consists substantially in the construction, combination, location, and relative arrangement of parts, all as will be more fully hereinafter set forth, as shown by the accompanying drawing, and finally pointed out in the appended claims.

Referring to the drawing:—

Figure 1 is a sectional view in end elevation taken on the line 1, 1, Fig. 2, and looking in the direction of the arrows.

Fig. 2 is a sectional view taken on the line 2, 2, Fig. 1.

Fig. 3 is a side view of a spanner wrench or tool employed in accordance with my invention.

Fig. 4 is an end view of the same.

The same part is designated by the same reference numeral wherever it appears throughout the several views.

In demountable wheels such as are employed extensively in connection with motor vehicles, and particularly with wheels of the wire spoke type it is desirable to provide means by which the wheel may be readily detachable and removable from its hub and quickly and easily applied thereto, and securely clamped in place in such manner as to be locked in position when applied. It is also desirable to provide means to prevent the accidental disengagement or release of the locking means employed by reason of the backing off of the clamping nut usually employed in connection with locking devices, through jolts, shocks, or otherwise. It is also desirable to provide a hub cap locking device for detachable or demountable wheels which is simple, economical to manufacture, and efficient in operation. It is among the special purposes of my present invention to provide a hub cap locking device for detachable demountable wheels which secures the advantages and desirable characteristics referred to by means of the characteristic features of construction as will be more fully hereinafter set forth.

Referring to the drawing,—1 indicates the outer shell which forms a part of the wheel proper. The axle 2 is secured to an inner hub shell 3 and is held in place relative thereto by means of the nut 4. The outer shell 1 is outwardly flared as indicated at 5 to form a pocket 6 circumferentially therein, which accommodates a stop plate 7 which carries the stop lugs 8. The outer end of the hub shell 3 is provided with exterior screw threads to allow the hub cap 9 to screw thereover. The hub cap in this form of structure I prefer to make from a brass casting, and it is provided with the interior threads which engage the cap with the hub shell as shown. A slot 10 is formed transversely through the shell of the hub cap and parallel to the outer face thereof. Located within the hub cap is a safety latch 11. The safety latch is pivoted at 12 approximately in its center in the slot 10 and on an axis parallel with that of the cap. In the tail of the latch is a hole 13 which is countersunk slightly on the side nearest to the hub cap face. The latch is provided with a tooth 14 adapted to project through the slot 10 and into the pocket 6 of the outer shell 1 to engage against the lug 8 located therein. The hub cap casting is provided with two holes 17 and 18 in the face thereof, one of which, namely, hole 18, extends but a short distance into the casting; the other hole, namely 17, is in line and communicates with the countersunk hole 13 of the safety latch 11 as shown best in Fig. 1.

A spring 20 located and anchored within the hub cap and secured to the latch 11 normally holds the latch in its locked position, namely, which is shown in Fig. 1. The wrench employed is illustrated in Figs. 3 and 4 and consists of the handle 25 provided with the spanner head 26, which head carries the pins 27 and 28 respectively. The pin 27 is longer than the pin 28. I show the pins duplicated on opposite faces of the wrench so that in case one pin should break the opposite side of the spanner wrench may be employed. From the foregoing the operation of the device will be seen to be as follows:—To remove the outer shell 1, and consequently the wheel, the spanner wrench 25 is placed in position with the pin 28 in hole 18 of the hub cap and the pin 27 in hole 17 of the hub cap. The pin 27 passing through the hole 17 of the cap rocks the safety latch 11 about its pivot 12 thereby withdrawing the tooth or projection 14 thereof out of engagement with the lug 8 of the stop plate 7. The nut can then be unscrewed from the hub shell 3 as will be readily understood.

From the foregoing it will be seen that when the wrench pin is inserted the wrench pin raises the rear or tail end of the safety latch which depresses the front of the locking end of the safety latch thereby bringing the top or pivoted portion of the latch to a position that is flush with the outside surface of the hub cap. Thus a short movement of the tail end of the latch brings it to the disengaging position due to the proportioning of the latch. The moment the wrench is withdrawn the spring automatically moves the latch into the locking position and holds it there, the locking portion of the latch presses against the stop plate teeth, or lugs, and there is no opportunity for it to disengage as the front of the latch locking surface is made circumferential about the pivot pin 12 thereof as shown. Any tendency for the hub cap to back off due to the rotation of the wheel causes the latch to press harder against the stop plate teeth thereby forming a most efficient locking device for the hub.

Having now set forth the objects and nature of my invention, and having shown and described an embodiment thereof, what I claim as new and useful and of my own invention, and desire to secure by Letters Patent, is,—

1. In a hub structure, the combination with a hub shell, and an outer shell, of a hub cap adapted to fit on said hub shell to hold said outer shell in position thereon, and provided with a slot therein parallel to the plane of the face of said cap, a stop plate carried by said outer shell to extend circumferentially around said cap in the plane of said slot, a latch pivotally mounted in said slot and provided with a portion at one side of its pivot adapted to extend out of said slot into engaging relation with said stop plate, and a hole through the portion of said latch on the other side of its pivot, said cap being provided with a pair of holes, one of said holes being positioned opposite the hole of said latch and off center relative thereto substantially as and for the purposes described.

2. In a hub structure, the combination with a hub shell, and an outer shell, of a hub cap adapted to fit on said hub shell to hold said outer shell in position thereon, and provided with a slot therein parallel to the plane of the face of said cap, a stop plate carried by said outer shell to extend circumferentially around said cap in the plane of said slot, a latch pivotally mounted in said slot and provided with a portion at one side of its pivot adapted to extend out of said slot into engaging relation with said stop plate, and a hole through the portion of said latch on the other side of its pivot, said cap being provided with a pair of holes, one of said holes being positioned opposite said slot and extending therein to accommodate means for engaging said latch to rock the same about its pivot.

3. In a hub structure, the combination with a hub shell, and an outer shell, of a hub cap adapted to fit on said hub shell to hold said outer shell in position thereon, and provided with a slot therein parallel to the plane of the face of said cap, a stop plate carried by said outer shell to extend circumferentially around said cap in the plane of said slot, a latch pivotally mounted in said slot and provided with a portion adapted to extend out of said slot into engaging relation with said stop plate, said cap being provided with a pair of holes, one of said holes being positioned to communicate with said latch to accommodate means for engaging said latch to rock the same about its pivot.

4. In a device of the class described, the combination of an inner hub, an outer hub removably mounted thereon, a hub cap screwed on the inner hub and engaging the outer hub to hold the two in engagement, said hub cap having a slot through the side wall thereof lying in a plane perpendicular to the axis thereof, a keeper member on the outer hub in the plane of said slot, and a latch pivoted in said slot on an axis parallel to the axis of the hub cap and having a nose extending into engagement with said keeper member.

5. In a device of the class described, the combination of an inner hub, an outer hub removably mounted thereon, a hub cap screwed on the inner hub and engaging the outer hub to hold the two in engagement, said hub cap having a slot in the side wall thereof lying in a plane perpendicular to the axis thereof, a keeper member on the outer hub in the plane of said slot, and a latch, pivoted in said slot and swinging in the plane thereof, said latch having a nose normally engaging said keeper member and a part disposed in position to be engaged by a part of the hub cap wrench when the latter is applied to the hub cap.

6. In a device of the class described, the combination of an inner hub, an outer hub removably mounted thereon, a hub cap screwed on said inner hub and engaging the outer hub to hold the two in engagement, said hub cap having a slot therein lying in a plane perpendicular to the axis thereof, a keeper member on the outer hub, and a latch pivoted in said slot and having a nose, normally extending into engagement with said keeper member, and a tail having a hole therethrough, there being a pair of holes in the face of said hub cap one of which is positioned opposite the hole in the tail of said latch and off center relatively thereto.

7. In a device of the class described, the combination of an inner hub, an outer hub removably mounted thereon, a hub cap screwed on the inner hub and engaging the outer hub to hold the two in engagement, said hub cap having a slot lying in a plane perpendicular to the axis thereof, a keeper member on the outer hub in said plane, and a latch pivoted in said slot and having a nose, normally engaging said keeper member, and a tail, the face of said hub cap having a pair of holes one of which is positioned to accommodate means for engaging the tail of said latch to rock the same on its pivot.

In testimony whereof I have hereunto set my hand on this 7th day of August A. D., 1917.

CHARLES SCHENCK.